United States Patent
Forter et al.

[15] 3,671,514
[45] June 20, 1972

[54] PHENYL-AZO-NAPHTHOL COMPOUNDS OF LOW SOLUBILITY

[72] Inventors: Willy Forter, Allschwil/Basel, Switzerland; Armand Henrard, Gand, Belgium; Fritz Kehrer, Basel, Switzerland; Urs Martin Keller, Binningen/Basel, Switzerland; Hans Wasem, Basel, Switzerland

[73] Assignee: Sandoz Ltd., (a/k/a Sandoz A.G.), Basle, Switzerland

[22] Filed: Feb. 6, 1969

[21] Appl. No.: 797,235

[30] Foreign Application Priority Data

Feb. 20, 1968    Switzerland .......................... 2458/68

[52] U.S. Cl. .......................... 260/203, 106/23, 106/288, 106/308, 117/138.8 R, 117/138.8 E, 117/139, 117/142, 260/162, 260/193
[51] Int. Cl. .......................... C07c 107/04, C07c 107/06
[58] Field of Search .......................... 260/203

[56] References Cited

UNITED STATES PATENTS

| | | | |
|---|---|---|---|
| 2,367,073 | 1/1945 | Thurston | 260/207 X |
| 2,920,070 | 1/1960 | Jirou et al. | 260/207 X |
| 3,200,109 | 8/1965 | Ribka | 260/203 |
| 3,260,713 | 7/1966 | St. Alban et al. | 260/207 X |

FOREIGN PATENTS OR APPLICATIONS

| | | | |
|---|---|---|---|
| 785,672 | 10/1957 | Great Britain | 260/204 |
| 1,392,484 | 2/1965 | France | 260/204 |

*Primary Examiner* — Lewis Gotts
*Assistant Examiner* — Charles F. Warren
*Attorney* — Irwin Morton Aisenberg

[57] ABSTRACT

Monoazo pigments of the formula

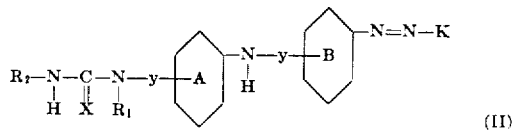

(II)

wherein
X is O, S or NH,
y is —CO— or —$SO_2$—,
$R_1$ is H or optionally substituted alkyl or phenyl,
$R_2$ is H or optionally substituted alkyl, phenyl or

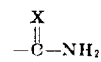

K is a 2-hydroxy-3-naphthoic acid phenyl- or naphthylamide, wherein the phenyl or naphthyl of the amide radical may be further substituted, and the rings A and B may be further substituted;
are suitable for the pigmentation of plastics and synthetic resins, e.g. polyethylene, polystyrene, polyvinyl chloride, and of rubber, synthetic leather, printing inks and surface coatings. In addition they can be employed for the spin dyeing of viscose rayon and cellulose acetate, and for pigment printing, paper dyeing in the stock, and the coloration of coating mixtures applied to textiles. In these materials they are of yellow to red shade and show outstandingly good light and migration fastness, along with good to very good fastness to washing, chlorite, hypochlorite and peroxide bleaching, cross dyeing, blind vats, hydrosulphite, dry cleaning, rubbing overspraying and sulphates. They show good transparency and heat stability

9 Claims, No Drawings

PHENYL-AZO-NAPHTHOL COMPOUNDS OF LOW SOLUBILITY

This invention relates to azo compounds which bear a substituent of the formula

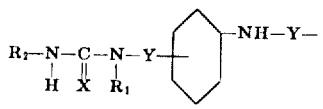

(I)

and are notable for their extremely good properties in application as pigments.

These new compounds are of the general formula

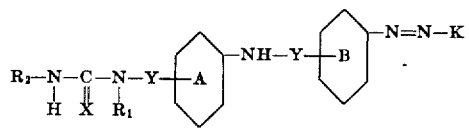

(II)

and are formed by diazotization of an amine of the formula

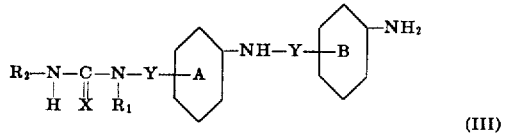

(III)

followed by coupling of the resulting diazo compound with a compound of the formula

 (IV).

In the foregoing formulas $R_2$ stands for a hydrogen atom, a hydrocarbon radical which may be substituted or an acyl radical, $R_2$ for a hydrogen atom, an acyl radical or a radical of the formula

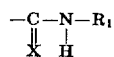

K for a radical of the aromatic or heterocyclic series or a radical of the formula

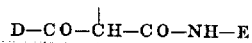

D for a hydrocarbon radical which may be substituted and/or may contain hetero atoms, E for a radical of aromatic character, the two Y's, independently of each other, for —CO— or —SO$_2$—, and X for an oxygen sulphur or selenium atom or a group = NR$_1$; the nuclei A and/or B may bear further substituents with the exception of free carboxylic or sulphonic acid groups.

Alternatively, the pigments of formula (II) can be produced by reacting an amine of the formula

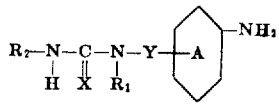

(V)

with an acid halide (preferably an acid chloride) of the formula

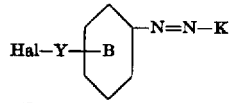

(VI)

The amines of formula (III) can be prepared, for example, by reacting an amine of formula (V) with an acid halide of the formula

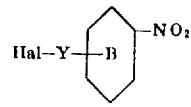

(VII)

and then reducing the nitro group.

The halogen atoms are, preferably, chlorine or bromine atoms. The alkyl and alkoxy groups generally contain up to four or, preferably, one or two carbon atoms. Phenyl radicals are particularly suitable aryl radicals. The term "hydrocarbon radical," generally denotes alkyl or aryl radicals as described above.

Suitable substituents on the alkyl and alkoxy radicals include halogen atoms, hydroxyl groups which may be acylated or etherified by alkyl groups, cyano and acyl groups; the radicals of aromatic character may bear nitro groups in addition to the aforenamed substituents.

The acyl groups in the pigments are generally radicals of formula R—L— or R'—M— where

R stands for a hydrocarbon radical which may bear non-water-solubilizing substituents and/or hetero atoms, especially alkyl or phenyl radicals (as described above), L for —OCO— or —SO$_2$—, R' for a hydrogen atom or R, M for —CO—, —NR"CO— or —NR"SO$_2$—and, R" for a hydrogen atom or R.

Preferred compounds of formula (II) correspond to the formula

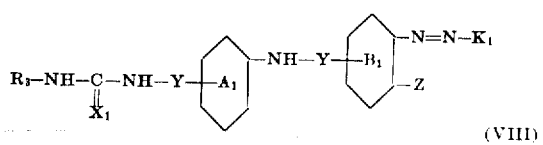

(VIII)

where

R$_3$ stands for a hydrogen atom or acetyl or benzoyl radical or a radical of the formula

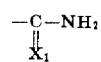

K$_1$ for a 2-hydroxy-3-naphthoic acid phenylamide or 2-hydroxy-3-naphthoic acid naphthylamide radical, which both of which may be substituted by chlorine or bromine atoms, methyl, methoxy or ethoxy groups; a 1-phenyl-3-methylpyrazolyl radical; or a radical of formula

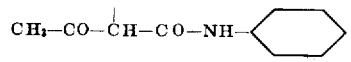

which may be substituted in the phenyl nucleus by chlorine or bromine atoms, methyl, methoxy or ethoxy groups, X$_1$ for an oxygen or sulphur atom or = NH, the two Y's, independently of each other, stand for groups of formula —SO$_2$— or —CO—, and Z stands for a hydrogen, chlorine or bromine atom; the nuclei A$_1$ and B$_1$ may be further substituted, the former by chlorine or bromine atoms, methyl, methoxy or ethoxy groups and the latter by chlorine or bromine atoms, methoxy, ethoxy, nitro, methoxycarbonyl or ethoxycarbonyl groups.

The compounds of formula (VIII) are produced by one of the methods described above.

The diazotized amines of formula (III) are coupled with the compounds of formula (IV) by the generally known method, e.g. in weakly acid, neutral or alkaline medium at room temperature or with cooling. The compounds of formula (V) are generally reacted with the acid halides of formula (VI) or (VII) in an inert organic solvent, e.g. xylene, nitrobenzene or a chlorobenzene, and preferably in the presence of an acid-binding agent, e.g. alkali carbonates, bicarbonates or acetates, in the temperature range of 60° to 160° C.

The monoazo pigments of this invention are suitable in the presences or absence of solvents, for the pigmentation of plastics and synthetic resins e.g. polyethylene, polystyrene, polyvinyl chloride, and of rubber, synthetic leather, printing inks and surface coatings. In addition they can be employed for the spin dyeing of viscose rayon and cellulose acetate, and for pigment printing, paper dyeing in the stock, and the coloration of coating mixtures applied to textiles. In these materials they are of yellow to red shade and show outstandingly good light and migration fastness, along with good to very good fastness to washing, chlorite, hypochlorite and peroxide bleaching, cross dyeing, blind vats, hydrosulphite, dry cleaning, rubbing, overspraying and sulphates. They show good transparency and heat stability. In the examples the parts and percentages are by weight and the temperature in degrees centigrade.

Example 1

3.82 Parts of 3-amino-4-chlorobenzoic acid anilide-2'-methyl-5'-sulphonic acid imidoureide are stirred in 200 parts of 5 normal hydrochloric acid solution. On cooling to 0°, 10 parts of 1 normal sodium nitrite solution are added for diazotization. After stirring for 1 hour, the solution is filtered and then adjusted to pH 3.5 with aqueous sodium acetate solution. A solution of 3.6 parts of 2-hydroxy-3-naphthoic acid-2',4'5'-chlorophenylamide in 40 parts of ethanol, 80 parts of water and 10 parts of 30 percent sodium hydroxide solution is allowed to run into the diazo solution with stirring. The temperature is raised slowly to 50° to bring the coupling reaction to a close, after which it is raised further to 90°. The product is then filtered off, washed and vacuum dried at 60°.

A red pigment in a yield of 7 parts is obtained. In plasticized polyvinyl chloride it gives shades of very good light fastness which are not subject to migration. If the pigment is treated with solvents, e.g. toluene, mono-, di- or tri-chlorobenzene, nitrobenzene or dimethyl formamide, with heating, it pigments suitable materials in shades of greater brightness and depth.

Example 2

10.1 Parts of the dye produced by coupling diazotized 5-amino-2-nitrobenzoic acid with 2-hydroxy-3-naphthoic acid-2'-naphthylamide are dissolved in 100 parts of toluene and 3 parts of thionyl chloride at 85°. After 4 hours the resulting solution of the acid chloride is mixed with a solution of 5 parts of 1-amino-3-chlorobenzene-5-sulphonic acid imidoureide in 30 parts of toluene and 2 parts of pyridine. The combined solution is maintained at 100° for 5 hours. The pigment thus formed is filtered off, washed with ethanol and vacuum dried at 60°. It pigments polyvinyl chloride in yellowish red shades which have very good light and migration fastness.

Example 3

3.77 Parts of 3-amino-4-chlorobenzoic acid anilide-2'-methyl-5'-sulphonic acid imidoureide are diazotized as given in Example 1. The diazo solution is run into an acetic acid suspension of 2.8 parts of acetoacetic acid-4-chloro-2,5-dimethoxyphenylamide. The temperature is then raised to 90° and the pigment formed filtered off.

This pigment gives yellow shades in polyvinyl chloride which have very good light and migration fastness.

Pigments of the same hue and with very similar fastness properties are obtained when in place of 2.8 parts of acetoacetic acid-4-chloro-2,5-dimethoxyphenylamide an equivalent amount of acetoacetic acid-4-bromo-2,4-diethoxyphenylamide, acetoacetic acid-4-chloro-2-methoxyphenylamide or acetoacetic-2,5-dimethoxyphenylamide is employed.

In the following tables details are given of further diazotizable amines and coupling compounds which, on reaction with each other in accordance with the preceding Examples, yield pigments conforming to this invention which have the aforestated fastness properties. The shade of the pigments in polyvinyl chloride is noted in the final column of the tables.

| Ex. No. | Amine | Coupling compound | Shade in PVC |
|---|---|---|---|
| 4 | $H_2N-C(=NH)-NHSO_2-$ [phenyl with $OCH_3$, $OCH_3$, $NHCO$] -[phenyl with $NH_2$, $COOCH_3$] | [naphthyl with $OH$, $CONH$]-[phenyl with $CH_3$, $CH_3$] | Yellow-red. |
| 5 | $H_2N-C(=NH)-NHCO-$ [phenyl with $OCH_3$, $NHCO$] -[phenyl with $OCH_3$, $NH_2$] | [naphthyl with $OH$, $CONH$]-[phenyl with $OCH_3$, $Cl$, $OCH_3$] | Red. |
| 6 | $H_2N-C(=NH)-NHCO-$ [phenyl with $Cl$, $NHCO$] -[phenyl with $Cl$, $NH_2$] (additional $Cl$) | [naphthyl with $OH$, $CONH$]-[phenyl with $OCH_3$] | Yellow-red. |
| 7 | $H_2N-C(=O)-NHCO-$ [phenyl with $NHCO$] -[phenyl with $NH_2$] | $CH_3COCH_2CONH-$[phenyl with $OCH_3$, $OCH_3$] | Red. |
| 8 | $H_2N-C(=O)-NHSO_2-$ [phenyl with $CH_3$, $NHCO$] -[phenyl with $COOC_2H_5$, $NH_2$] | $CH_3COCH_2CONH-$[phenyl with $OCH_3$, $Cl$, $OCH_3$] | Yellow. |
| 9 | $H_2N-C(=O)-NHSO_2-$ [phenyl with $Cl$, $NHCO$] -[phenyl with $Br$, $NH_2$] | $CH_3COCH_2CONH-$[phenyl with $OCH_3$] | Do. |

| Ex. No. | Amine | Coupling compound | Shade in PVC |
|---|---|---|---|
| 10 | 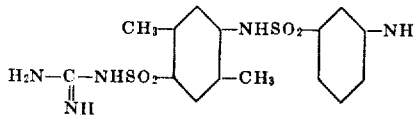 | 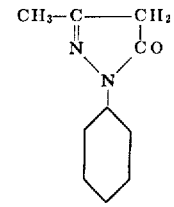 | Orange. |
| 11 | 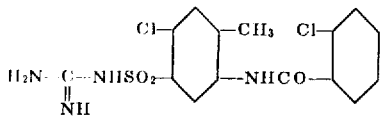 | 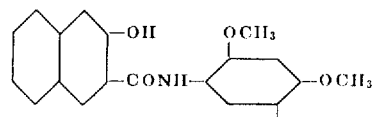 | Red. |
| 12 | 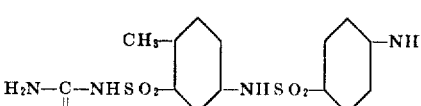 | 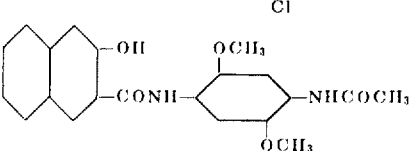 | Red. |
| 13 | 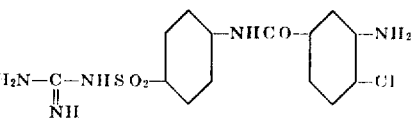 | 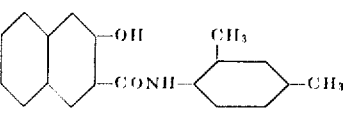 | Orange. |
| 14 | Same as above | 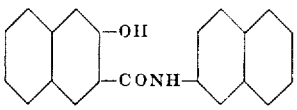 | Red. |
| 15 | ....do.... | 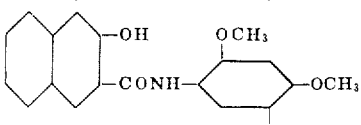 | Brown-red. |
| 16 | 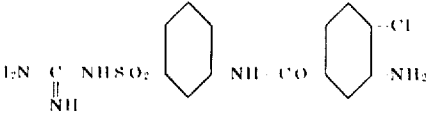 | 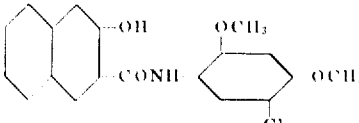 | Red. |
| 17 | Same as above | 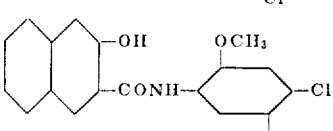 | Red. |
| 18 | 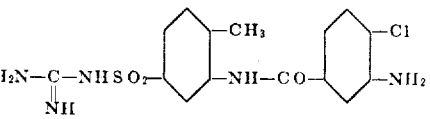 | Same as above | Red. |
| 19 | Same as above | 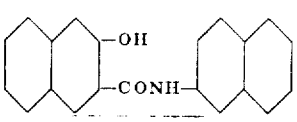 | Red. |
| 20 | 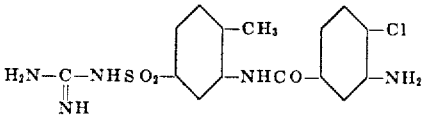 | 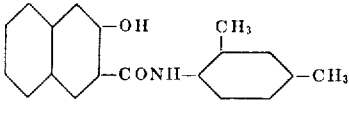 | Red. |
| 21 | 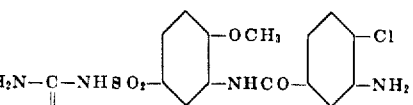 | Same as above | Red. |
| 22 | Same as above | 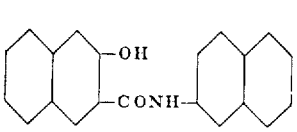 | Red. |

| Ex. No. | Amine | Coupling compound | Shade in PVC |
|---|---|---|---|
| 23 | do | naphthol-OH, -CONH-phenyl(OCH$_3$, OCH$_3$, Cl) | Red. |
| 24 | do | naphthol-OH, -CONH-phenyl(OCH$_3$, Cl, OCH$_3$) | Red. |
| 25 | do | naphthol-OH, -CONH-phenyl(CH$_3$, OCH$_3$) | Red. |
| 26 | H$_2$N-C(=NH)-NH-SO$_2$-phenyl(Cl)-NHCO-phenyl(Cl)-NH$_2$ | naphthol-OH, -CONH-phenyl(OCH$_3$, Cl, OCH$_3$) | Red. |
| 27 | Same as above | naphthol-OH, -CONH-phenyl(OCH$_3$, OCH$_3$, Cl) | Red. |
| 28 | do | naphthol-OH, -CONH-naphthyl | Red. |
| 29 | do | naphthol-OH(CH$_3$), -CONH-phenyl(CH$_3$) | Red. |
| 30 | H$_2$N-C(=NH)-NHSO$_2$-phenyl(Cl)-NHCO-phenyl(Cl)-NH$_2$ | naphthol-OH, -CONH-phenyl(OCH$_3$) | Red. |
| 31 | Same as above | naphthol-OH, -CONH-phenyl | Red. |
| 32 | do | CH$_3$COCH$_2$CONH-phenyl(OCH$_3$) | Yellow. |
| 33 | do | CH$_3$COCH$_2$CONH-phenyl(OCH$_3$, Cl, OCH$_3$) | Do. |
| 34 | H$_2$N-C(=NH)-NHSO$_2$-phenyl(OCH$_3$)-NHCO-phenyl(Cl)-NH$_2$ | CH$_3$COCH$_2$CONH-phenyl(OCH$_3$, OCH$_3$) | Do. |
| 35 | Same as above | CH$_3$COCH$_2$CONH-phenyl(CH$_3$, CH$_3$) | Do. |
| 36 | do | CH$_3$COCH$_2$CONH-phenyl(OCH$_3$, Cl, OCH$_3$) | Do. |

| Ex. No. | Amine | Coupling compound | Shade in PVC |
|---|---|---|---|
| 37 | ....do.... | CH₃COCH₂CONH—⟨phenyl-CH₃,Cl⟩ | Do. |
| 38 | H₂N—C(=S)—NHSO₂—⟨phenyl⟩—NHCO—⟨phenyl-Br⟩—NH₂ | ⟨naphthyl⟩-OH, -CONH—⟨phenyl-CH₃,CH₃⟩ | Red. |
| 39 | H₂N—C(=S)—NHCO—⟨phenyl-Cl⟩—NHCO—⟨phenyl-Br⟩—NH₂ | CH₃COCH₂CONH—⟨phenyl-OCH₃,Cl,OCH₃⟩ | Yellow. |
| 40 | CH₃CO—NH—C(=NH)—NHSO₂—⟨phenyl⟩—NHCO—⟨phenyl-Br⟩—NH₂ | ⟨naphthyl⟩-OH, -CONH—⟨phenyl-OCH₃,OCH₃,OCH₃⟩ | Red. |
| 41 | C₆H₅CO—NH—C(=NH)—NHSO₂—⟨phenyl⟩—NHCO—⟨phenyl-Cl⟩—NH₂ | ....do.... | Red-Brown. |

Formulae of representative dyestuffs of the foregoing Examples are as follows:

[Structure] Example 1

[Structure] Example 3

[Structure] Example 23

[Structure] Example 24

[Structure] Example 35

We claim:
1. Monoazo pigment free from free carboxylic acid and free sulphonic acid groups and of the formula

$$R_2-\underset{H}{N}-\underset{X}{\overset{C}{\|}}-\underset{R_1}{N}-Y-\boxed{A}-\underset{H}{N}-Y-\boxed{B}-N=N-K$$

wherein
K is a substituted or unsubstituted member selected from the group consisting of 2-hydroxy-3-naphthoic acid phenylamide and 2-hydroxy-3-naphthoic acid naphthylamide; the carbon at the 1-position being directly bound to the available bond on one of the azo nitrogen atoms; any substituent on a substituted phenylamide nucleus being a member selected from the group consisting of chloro, bromo, lower alkyl, lower alkoxy and lower alkylcarbonylamino; any substituent on a substituted naphthylamide being a member selected from the group consisting of chloro, bromo, lower alkyl and lower alkoxy;
R₁ is a member selected from the group consisting of a hydrogen atom, a hydrocarbon radical and a substituted hydrocarbon radical;
R₂ is a member selected from the group consisting of a hydrogen atom, acyl and a radical of the formula

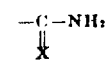

each Y is, independently, —CO— or —SO$_2$—;

X is a member selected from the group consisting of O, S and NH; each of nuclei A and B is, independently, further unsubstituted or further substituted; any further substituent on nucleus A being a member selected from the group consisting of chloro, bromo, lower alkyl and lower alkoxy; any further substituent on nucleus B being a member selected from the group consisting of chloro, bromo, lower alkoxy, nitro and lower alkoxycarbonyl; a carbon of nucleus B ortho to the azo group being either unsubstituted or substituted by chloro or bromo;

acyl is one of the radicals R—L— and R'—M—;

R is phenyl or alkyl having up to four carbon atoms;

L is —SO$_2$—;

R' is a hydrogen atom or R;

M is —CO—;

each hydrocarbon radical being phenyl or alkyl having up to four carbon atoms; any substituent on a substituted alkyl being a member selected from the group consisting of chloro, bromo, hydroxy, alkoxy having up to four carbon atoms and cyano and any substituent on a substituted phenyl being a member selected from the group consisting of chloro, bromo, hydroxy, alkoxy having up to four carbon atoms, cyano and nitro.

2. Monoazo pigment according to claim 1 wherein any acyl R$_2$ is acetyl or benzoyl.

3. Monoazo pigment according to claim 2 wherein any lower alkyl substituent on nucleus A or on K is methyl.

4. Monoazo pigment according to claim 3 wherein any lower alkylcarbonylamino substituent on K is acetamido.

5. Monoazo pigment according to claim 4 wherein any lower alkoxy substituent on nucleus A, nucleus B or K is methoxy or ethoxy.

6. Monoazo pigment according to claim 5 wherein any lower alkoxycarbonyl substituent on nucleus B is methoxycarbonyl or ethoxycarbonyl.

7. Dyestuff according to claim 1 of the formula

8. Dyestuff according to claim 1 of the formula

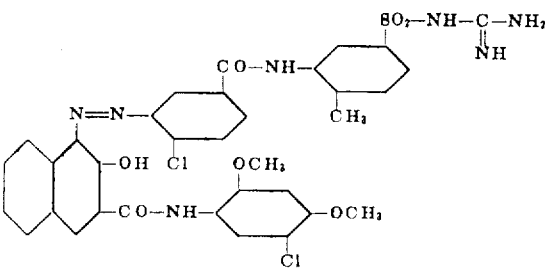

9. Dyestuff according to claim 1 of the formula

* * * * *

UNITED STATES PATENT OFFICE
CERTIFICATE OF CORRECTION

Patent No. 3,671,514          Dated    June 20, 1972

Inventor(s) WILLY FORTER, ARMAND HENRARD, FRITZ KEHRER, URS MARTIN KELLER, HANS WASEM It is certified that error appears in the above-identified patent and that said Letters Patent are hereby corrected as shown below:

Covering page, in the Abstract, line 8, after the formula, insert a comma --,--; antepenultimate line "rubbing" should read --rubbing,--; last line, "stability" should read --stability.--. Column 1, line 19, after the formula, "(II)" should read --(II),--; line 39, after the formula, insert a comma --,--; line 44, after the formula, insert a comma --,--; line 49, "or -" should read --or--; line 50, "SO$_2$-" should read -- -SO$_2$- --; line 51, "group =" should read --group--; line 52, "NR$_1$" should read -- =NR$_1$--.
Column 2, line 20, "-and," should read -- - and--; line 30, after the formula, "(VIII)" should read --(VIII),--; line 35, after the formula, insert a comma --,--; line 39, "radical, which" should read --radical,--; line 42, "of formula" should read --of the formula--; line 45, after the formula, insert a comma --,--; line 71, "suitable" should read --suitable,--; line 72, "presences" should read --presence--; line 73, "resins e.g." should read --resins, e.g.--. Column 3, line 21, "2',4'5'-chlorophenylamide" should read --2',4'-dimethoxy-5'-chlorophenylamide--. Column 10, line 76, after the formula, insert a semicolon --;--. Column 11, line 2, "O," should read -- =O,--; line 3, "S and NH;" should read -- =S and =NH;--; line 21, "cyano" should read --cyano;--. Column 12, in the formula " 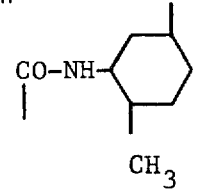 " should read

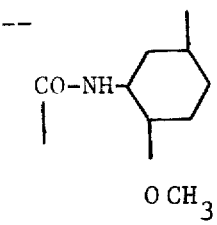 .

Signed and sealed this 6th day of March 1973.

(SEAL)
Attest:

EDWARD M. FLETCHER, JR.        ROBERT GOTTSCHALK
Attesting Officer              Commissioner of Patents

UNITED STATES PATENT OFFICE
CERTIFICATE OF CORRECTION

PATENT NO. : 3,671,514
DATED : June 20, 1972
INVENTOR(S) : Willy Forter et al

It is certified that error appears in the above-identified patent and that said Letters Patent are hereby corrected as shown below:

Column 7, Example 30, that portion of the formula reading

" $H_2N-C-NHSO_2-$ " should read -- $H_2N-\underset{\underset{NH}{\|}}{C}-NHSO_2-$ --

Signed and sealed this 17th day of June 1975.

(SEAL)
Attest:

RUTH C. MASON
Attesting Officer

C. MARSHALL DANN
Commissioner of Patents
and Trademarks